US006721024B1

(12) United States Patent
Kishimoto et al.

(10) Patent No.: US 6,721,024 B1
(45) Date of Patent: Apr. 13, 2004

(54) LIQUID CRYSTAL DISPLAY DEVICE

(75) Inventors: Katsuhiko Kishimoto, Nara (JP); Toshihisa Uchida, Gifu (JP); Masato Imai, Tokyo (JP)

(73) Assignees: Sharp Kabushiki Kaisha, Osaka (JP); Sony Corporation, Tokyo (JP)

( * ) Notice: Subject to any disclaimer, the term of this patent is extended or adjusted under 35 U.S.C. 154(b) by 0 days.

(21) Appl. No.: 09/612,389

(22) Filed: Jul. 7, 2000

(30) Foreign Application Priority Data

Jul. 16, 1999 (JP) .......................................... 11-202792
Dec. 8, 1999 (JP) .......................................... 11-349365

(51) Int. Cl.$^7$ .......................... G02F 1/13; G02F 1/1337
(52) U.S. Cl. ....................... 349/123; 349/129; 349/130; 349/156
(58) Field of Search ................................ 349/123, 129, 349/130, 156

(56) References Cited

U.S. PATENT DOCUMENTS

| 5,872,611 | A | * | 2/1999 | Hirata et al. ................. 349/147 |
| 6,043,860 | A | * | 3/2000 | Wei et al. .................... 349/187 |
| 6,067,141 | A | * | 5/2000 | Yamada et al. ............. 349/129 |
| 6,266,122 | B1 | * | 7/2001 | Kishimoto et al. ......... 349/156 |
| 6,271,904 | B1 | * | 8/2001 | Liu ............................. 349/110 |
| 6,327,016 | B1 | * | 12/2001 | Yamada et al. ............. 349/160 |
| 6,330,049 | B1 | | 12/2001 | Kume et al. |
| 6,335,780 | B1 | * | 1/2002 | Kurihara et al. ............ 349/156 |
| 6,339,462 | B1 | | 1/2002 | Kishimoto et al. |
| 6,342,939 | B1 | | 1/2002 | Hirata et al. |
| 6,396,559 | B1 | | 5/2002 | Kishimoto et al. |

FOREIGN PATENT DOCUMENTS

| JP | 06-301015 | 10/1994 |
| JP | 07-120728 | 5/1995 |
| JP | 2000-19522 | 1/2000 |

* cited by examiner

*Primary Examiner*—Toan Ton
*Assistant Examiner*—Hoan Nguyen
(74) *Attorney, Agent, or Firm*—Nixon & Vanderhye P.C.

(57) ABSTRACT

The liquid crystal display device of the present invention includes a first substrate, a second substrate, and a liquid crystal layer sandwiched by the first and second substrates. The first substrate includes polymer walls made of a transparent resin, the liquid crystal layer has a plurality of liquid crystal regions separated from one another by the polymer walls, and liquid crystal molecules in the plurality of liquid crystal regions are aligned axially symmetrically with respect to respective axes formed in the plurality of liquid crystal regions, the axes being vertical to a surface of the first substrate, and liquid crystal molecules above the polymer walls are aligned axially symmetrically with respect to respective axes formed on the polymer walls, the axes being vertical to the surface of the first substrate.

20 Claims, 8 Drawing Sheets $$WP \leqq \tfrac{3}{7} WL$$

$$WP \leq \frac{3}{7}WL$$

LIQUID CRYSTAL DISPLAY DEVICE

BACKGROUND OF THE INVENTION

The present invention relates to a liquid crystal display device, and more particularly to a liquid crystal display device where liquid crystal molecules are aligned axially symmetrically in liquid crystal regions separated from one another by polymer walls.

Conventionally, twisted nematic (TN) and super-twisted nematic (STN) liquid crystal display devices (LCDS) are used as display devices utilizing the electrooptic effect. In order to widen the viewing angle of these LCDs, various techniques are now under vigorous development.

As one of the viewing angle widening techniques proposed so far, Japanese Laid-Open Patent Publication No. 6-301015 and No. 7-120728 disclose a so-called axially symmetrically aligned microcell (ASM) mode LCD where liquid crystal molecules are aligned axially symmetrically in respective liquid crystal regions separated from one another by polymer walls. Each liquid crystal region substantially surrounded by the polymer walls is typically formed for each pixel. Since the liquid crystal molecules are aligned axially symmetrically, such an ASM mode LCD provides a wide viewing angle characteristic where change in a contrast ratio is small whichever direction an observer views the LCD.

The ASM mode LCDs disclosed in the above publications are fabricated by subjecting a mixture of a polymeric material and a liquid crystal material to polymerization induced phase separation.

A method for fabricating a conventional ASM mode LCD will be described with reference to FIG. 7. First, in step (a) shown in FIG. 7, a glass substrate 908 having a color filter and an electrode formed on one surface is prepared. The color filter and the electrode formed on the glass substrate 908 are not shown in FIG. 7 for simplification. Formation of the color filter is described hereinafter.

In step (b), polymer walls 917 for axially symmetrical alignment of liquid crystal molecules are formed in a lattice shape, for example, on the surface of the glass substrate 908 on which the color filter and the electrode are formed. Specifically, a photosensitive resin material is spin-coated on the glass substrate 908, exposed to light via a photomask having a predetermined pattern, and developed to form lattice-shaped polymer walls. The photosensitive resin material may be negative or positive. A non-photosensitive resin material may also be used although a step of forming a resist film is additionally required. An opaque material is used for formation of the polymer walls.

In step (c), column protrusions 920 are formed on the top faces of the resultant polymer walls 917 by dispersive patterning. The column protrusions 920 are obtained by exposing to light and developing a photosensitive resin material as in the polymer walls.

In step (d), the surface of the glass substrate 908 with the polymer walls 917 and the column protrusions 920 formed thereon is coated with a vertical alignment material 921 such as polyimide. Meanwhile, in steps (e) and (f), the surface of a counter substrate 902 on which an electrode is formed is also coated with the vertical alignment material 921.

In step (g), the resultant two substrates are bonded together with the surfaces thereof on which the electrode is formed facing each other, to form a liquid crystal cell. The gap between the two substrates (cell gap, i.e., the thickness of a liquid crystal layer) is defined by the sum of the height of the polymer walls 917 and the height of the column protrusions 920.

In step (h), a liquid crystal material is injected into the resultant cell gap by a vacuum injection method or the like. Finally, in step (i), a voltage is applied between a pair of opposing electrodes to align liquid crystal molecules axially symmetrically in each liquid crystal region 916. That is, liquid crystal molecules in the liquid crystal region 916 defined by the polymer walls 917 are aligned axially symmetrically with respect to an axis 918 (vertical to the substrates) shown by the dashed line in FIG. 7.

FIG. 8 shows a cross-sectional structure of a conventional color filter. The color filter includes colored resin sections of red (R), green (G), and blue (B) corresponding to respective pixels and a black matrix (BM) film for light-shading the gaps between the colored resin sections, which are formed on a glass substrate. The colored resin sections and the BM film are covered with an overcoat (OC) layer made of an acrylic resin or an epoxy resin having a thickness of about 0.5 to 2.0 $\mu$m for improving the smoothness and the like. The OC layer is then covered with an indium tin oxide (ITO) film as a transparent signal electrode. The BM film is generally made of a metal chromium film having a thickness of about 100 to 150 nm. The colored resin sections are made of resin materials colored with a dye or a pigment and generally have a thickness of about 1 to 3 $\mu$m.

The color filter is formed by patterning photosensitive colored resin layers formed on the substrate by photolithography. For example, R, G, and B photosensitive resin materials are individually subjected to the process of layer formation, light exposure, and development (the process is done total three times), to form the R, G, and B color filter sections. Each photosensitive colored resin layer can be formed by applying a liquid photosensitive colored resin material (obtained by diluting the material with a solvent) to the substrate by spin coating or the like, by transferring a dry film of a photosensitive colored resin material, or other methods. Using the thus-formed color filter, the ASM mode color LCD described above having a wide viewing angle characteristic is obtained.

However, the above conventional ASM mode LCD has the following problems. Although this LCD provides a wide viewing angle characteristic, the transmittance of the LCD lowers because the existence of the polymer walls reduces light transmission and liquid crystal molecules present above the polymer walls do not contribute to display. Moreover, the axially symmetrical alignment of liquid crystal molecules near the polymer walls is disturbed. This may generate light leakage in the black display state, for example, resulting in generation of flicker in an image.

In order to solve the above problems, one of the present inventors developed with co-researchers the following techniques: a technique for improving the transmittance of an LCD by forming the polymer walls using a transparent resin so that liquid crystal molecules present above the polymer walls are contributable to display; and a technique for stabilizing the axially symmetrical alignment of liquid crystal molecules present near the polymer walls by tilting the side faces of the polymer walls with respect to the substrate surface (Japanese Patent Application No. 10-185495).

The LCD disclosed in the above application exhibited improved contribution to display of the liquid crystal molecules present above the polymer walls, compared with the conventional LCD using an opaque resin material. However, the alignment of these liquid crystal molecules present above the polymer walls is disturbed. As a result, roughness (local variation in contrast ratio) is sometimes observed in the display image.

SUMMARY OF THE INVENTION

An object of the present invention is providing a liquid crystal display device that has a wide viewing angle characteristic and can realize bright and roughness-free display.

The liquid crystal display device of the present invention includes a first substrate, a second substrate, and a liquid crystal layer sandwiched by the first and second substrates, wherein the first substrate includes polymer walls made of a transparent resin, the liquid crystal layer has a plurality of liquid crystal regions separated from one another by the polymer walls, and liquid crystal molecules in the plurality of liquid crystal regions are aligned axially symmetrically with respect to respective axes formed in the plurality of liquid crystal regions, the axes being vertical to a surface of the first substrate, and liquid crystal molecules above the polymer walls are aligned axially symmetrically with respect to respective axes formed on the polymer walls, the axes being vertical to the surface of the first substrate.

The width of the polymer walls is preferably three sevenths or less of the width of the liquid crystal regions adjacent to the respective polymer walls.

The width of the liquid crystal regions is preferably 150 $\mu$m or less.

The polymer walls preferably have a face tilting with respect to the surface of the first substrate.

Preferably, the tilt face of the polymer walls has a first tilt portion tilting at a first tilt angle with respect to the surface of the first substrate and a second tilt portion tilting at a second tilt angle with respect to the surface of the first substrate, the first tilt angle is smaller than the second tilt angle, and the first tilt portion is closer to the surface of the first substrate than the second tilt portion.

The first tilt angle is preferably 5° or less, more preferably in the range between 3° and 5°, inclusive. The second tilt angle is preferably 10° or more, more preferably in the range between 10° and 90°, inclusive.

The liquid crystal layer may include a liquid crystal material having negative dielectric anisotropy.

The height of the polymer walls is preferably smaller than a half of the thickness of the liquid crystal layer.

DESCRIPTION OF THE PREFERRED EMBODIMENTS

Figure 1:
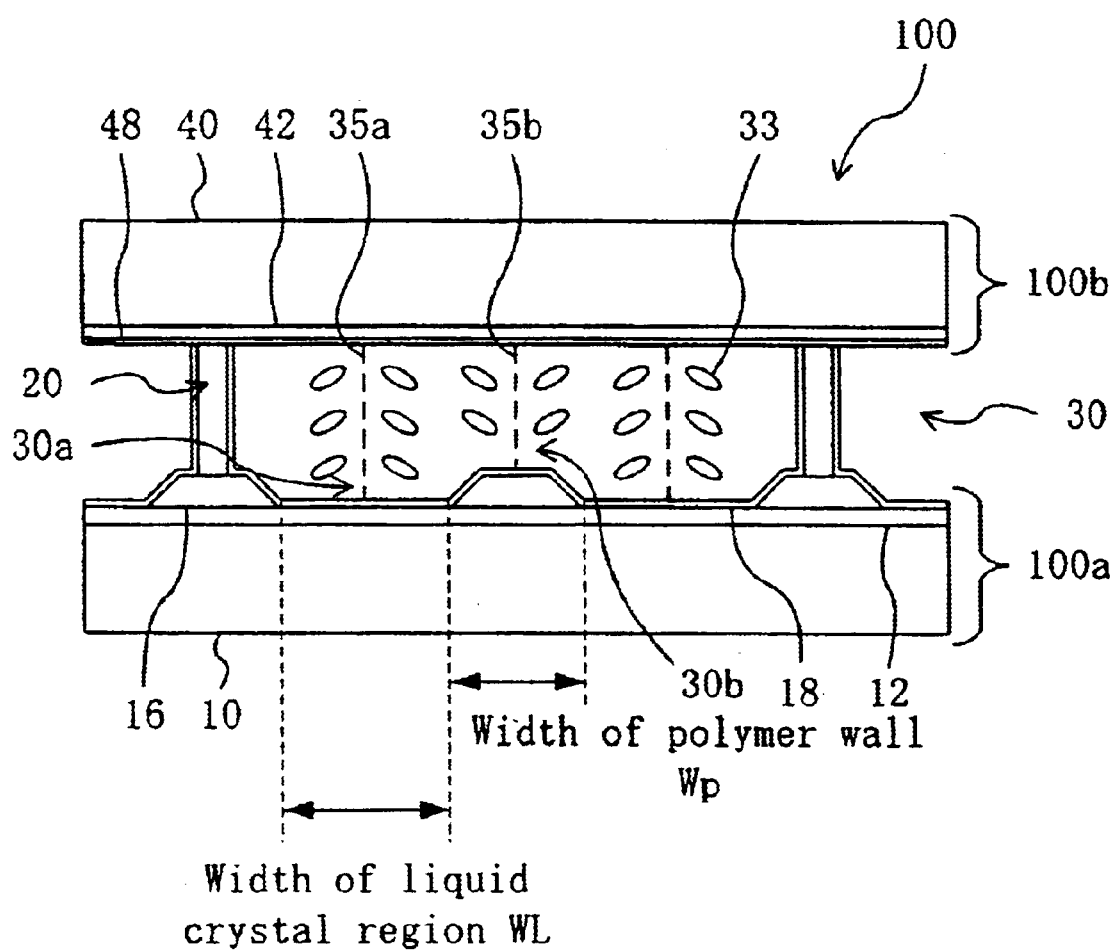
FIG. 1 is a schematic cross-sectional view of a liquid crystal display device (LCD) of EMBODIMENT 1 of the present invention.

The present invention has been derived from the results of an in-depth examination on the relationship between the structure and size of polymer walls and the orientation state of liquid crystal molecules in an ASM mode LCD.

According to the present invention, the polymer walls for aligning liquid crystal molecules axially symmetrically are made of a transparent material. This permits liquid crystal molecules present above the polymer walls to contribute to display, and thus significantly improves the display brightness compared with the case using non-transparent polymer walls. Moreover, the liquid crystal molecules present above the polymer walls are aligned axially symmetrically with respect to respective axes formed on the polymer walls. Therefore, these liquid crystal molecules are prevented from adversely influencing the display. If the width of the polymer walls exceeds three sevenths of the width of the liquid crystal regions, the liquid crystal molecules present above the polymer walls may fail to be stably aligned axially symmetrically. Further, if the width of the liquid crystal regions exceeds 150 $\mu$m, the alignment regulating force of the polymer walls for aligning liquid crystal molecules in the liquid crystal regions axially symmetrically may fail to sufficiently act on the liquid crystal molecules present above the polymer walls, resulting in failure of axially symmetrical alignment of the liquid crystal molecules present above the polymer walls. Therefore, in order to ensure that almost all the liquid crystal molecules present above the polymer walls are stably aligned axially symmetrically, the width (length of a longer side) of the liquid crystal regions is preferably 150 $\mu$m or less, and the width of the polymer walls is preferably three sevenths or less of the width of the liquid crystal regions.

The side faces of the polymer walls are tilted with respect to the substrate surface. The tilt side faces serve to reduce occurrence of a disturbance of the alignment of the liquid crystal molecules present near the polymer walls in the periphery of the liquid crystal regions. This minimizes generation of a light leakage due to an alignment disturbance in the periphery of the liquid crystal regions. As a result, the contrast ratio in the black display improves for the normally-black mode LCD including liquid crystal molecules having negative dielectric anisotropy that are aligned axially symmetrically. This improves the display quality.

In particular, stable axially symmetrical alignment is realized by tilting the side faces of the polymer walls with respect to the substrate surface at an angle not more than about 45° and not less than about 3°. In addition to this setting of a comparatively small tilt angle, the height of the polymer walls is preferably set at a smaller value. As the height of the polymer walls is smaller, the attenuation of the light passing through the transparent polymer walls reduces. This improves the transmittance and thus further improves the display brightness.

In addition to the control of the relationship between the width of the polymer walls and the width of the liquid crystal regions as described above, the following method is also effective for stably aligning the liquid crystal molecules in the liquid crystal regions and those above the polymer walls axially symmetrically. That is, the tilt structure of the side faces of the polymer walls is controlled in the following manner.

As a result of an elaborate examination on the relationship between the tilt structure of the side faces of the polymer walls and the stability of the axially symmetrical alignment of the liquid crystal molecules, the following has been found. As the tilt angle of the side faces of the polymer walls is greater, the alignment regulating force on the liquid crystal molecules is greater, thereby stabilizing the axially symmetrical alignment of the liquid crystal molecules. However, if the tilt angle is too large, the alignment of the liquid crystal molecules may become discontinuous, resulting in generation of a light leakage and thus lowering in contrast ratio in the black display. After further examination, it has been found that the following tilt structure of the polymer walls can retain continuity of the alignment of the liquid crystal molecules and exert a sufficiently large alignment regulating force on the liquid crystal molecules. The tilt structure is such that the side face of the polymer wall has at least two portions that tilt at different angles, and the tilt angle of the portion closer to the substrate is smaller. In order to retain continuity of the alignment of the liquid crystal molecules present near the boundaries between the substrate surface and the polymer walls, the tilt angle of the tilt portion closest to the substrate is preferably 5° or less. In order to exert a sufficient alignment regulating force on the liquid crystal molecules for stable axially symmetrical alignment of the liquid crystal molecules, the tilt angle of the tilt portion closest to the top faces (protrusion end faces in the liquid crystal layer) of the polymer walls is preferably 10° or more. Moreover, in order to retain continuity of the alignment of the liquid crystal molecules present above the side faces of the polymer walls, the tilt angle of the side faces preferably changes continuously. Therefore, the difference in tilt angle between at least two adjacent tilt portions is preferably 5° or less. It would be readily understood that the side face may also be formed of a curve.

Once the above conditions are satisfied, the liquid crystal molecules present above the side faces and top faces of the transparent polymer walls are made contributable to display, and it is possible to minimize occurrence of a disturbance of the alignment of the liquid crystal molecules present near the boundaries between the polymer walls and the liquid crystal regions (in the periphery of the liquid crystal regions) and a disturbance of the alignment of the liquid crystal molecules present above the polymer walls. As a result, high-quality display free from roughness is realized. It would be readily understood that the axially symmetrical alignment of the liquid crystal molecules in the liquid crystal regions and those present above the polymer walls can be further stabilized by controlling the tilt structure of the side faces of the polymer walls while controlling the relationship between the width of the polymer walls and the width of the liquid crystal regions.

If the tilt structure of the polymer walls is constructed so that the tilt angle gradually increases as it is located farther from the substrate surface and closer to the top face of the polymer wall, it is possible to obtain a tilt portion having a tilt angle larger than the tilt angle of a single-angle tilt structure. More concretely, an angle exceeding 45° can be obtained for the tilt portion closest to the top face of the polymer wall. According to the results of an examination conducted by the present inventors, the alignment regulating force on the liquid crystal molecules increases as the tilt angle is larger and the polymer walls are taller. Therefore, by forming a tilt portion having a larger tilt angle, a sufficient alignment regulating force can be retained even if the height of the polymer walls is small. If the height of the polymer walls is small, light attenuation due to the existence of the polymer walls can be reduced. Thus, the display brightness improves compared with the conventional case.

Hereinafter, preferred embodiments of the present invention will be described with reference to the accompanying drawings.

Embodiment 1

Figure 2:
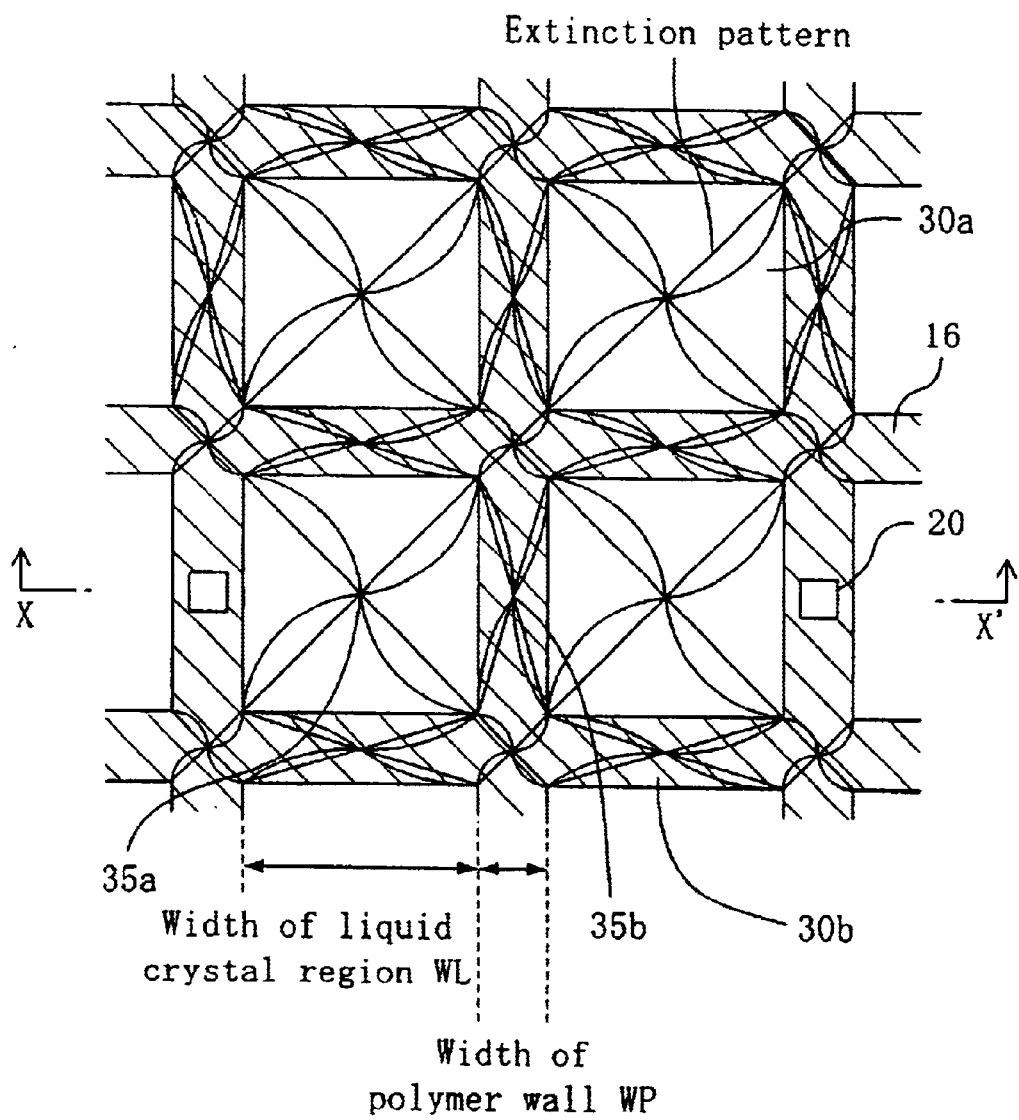
FIG. 2 is a schematic plan view of the LCD of FIG. 1.

The structure and operation of a liquid crystal display device (LCD) 100 of EMBODIMENT 1 of the present invention will be described with reference to FIGS. 1 and 2. FIG. 1 is a schematic cross-sectional view of the LCD 100 taken along line X–X' of FIG. 2 that is a schematic plan view thereof. FIGS. 1 and 2 illustrate the state where a voltage for gray scale display (gray scale voltage) has been applied to a liquid crystal layer. In this embodiment, a construction using a liquid crystal material having negative dielectric anisotropy and a vertical alignment film is exemplified. However, the present invention is not limited to this construction.

The LCD 100 includes a first substrate 100a, a second substrate 10b, and a liquid crystal layer 30 sandwiched by the two substrates. The liquid crystal layer 30 includes liquid crystal molecules 33 having negative dielectric anisotropy.

The first substrate 100a is constructed as follows. A first transparent electrode 12 made of ITO or the like is formed on the surface of a first transparent substrate 10 made of glass or the like facing the liquid crystal layer 30. Transparent polymer walls 16 made of a transparent resin material are formed on the first transparent electrode 12. On the top faces of the polymer walls 16, column protrusions 20 are selectively formed for defining the thickness of the liquid crystal layer 30 (cell gap). In this embodiment, the height of the polymer walls 16 is smaller than the height of the column protrusions 20. The polymer walls 16 are formed in a lattice shape in correspondence with the pixel regions, for example. The arrangement of the polymer walls 16 is however not limited to the illustrated one. The column protrusions 20 may be formed at an appropriate density so that a sufficient strength is provided. A vertical alignment film 18 is formed on the surface of the resultant first substrate 100a facing the liquid crystal layer 30 covering at least the first transparent electrode 12 and the transparent polymer walls 16, for orientating liquid crystal molecules 33 in the liquid crystal layer 30.

The second substrate 100b is constructed as follows. A second transparent electrode 42 made of ITO or the like is formed on the surface of a second transparent substrate 40 made of glass or the like facing the liquid crystal layer 30. A vertical alignment film 48 is formed covering the second transparent electrode 42.

The first electrode 12 and the second electrode 42 may be constructed in a known manner and may drive the liquid crystal layer 30 by a known driving method. For example, an active matrix type or a simple matrix type may be adopted. Alternatively, a plasma addressing type may be adopted, where a plasma discharge channel is provided in place of either one of the first electrode 12 and the second electrode 42. The first substrate and the second substrate may be interchanged with each other depending on the electrode construction and the driving method adopted. That is, the second substrate may have the transparent polymer walls 16 and the column protrusions 20.

The polymer walls 16 partition the liquid crystal layer 30 into a plurality of liquid crystal regions 30a and also serve to orientate liquid crystal molecules 33 in the liquid crystal regions 30a axially symmetrically. In other words, the liquid crystal regions 30a are defined by the polymer walls 16, and the polymer walls 16 substantially surround the liquid crystal regions 30a. The liquid crystal molecules 33 in the liquid crystal regions 30a are aligned axially symmetrically with respect to respective center axes 35a formed in the liquid crystal regions 30a. The polymer walls 16 are made of a transparent resin and have a width WP not more than three sevenths of the width WL of the liquid crystal regions 30*a*. As a result, liquid crystal molecules in regions 30*b* defined by the top faces of the polymer walls 16 are aligned axially symmetrically with respect to center axes 35*b* formed in the respective regions 30*b*. The center axes 35*a* and 35*b* for the axially symmetrical alignment of the liquid crystal molecules 33 are substantially vertical to the surface of the substrate 10.

In the state where no voltage is applied to the liquid crystal layer 30, the liquid crystal molecules 33 are aligned substantially vertical to the substrate plane under the alignment regulating force of the vertical alignment films 18 and 48 formed on the surfaces of the substrates 100*a* and 100*b* facing the liquid crystal layer 30. When this state is observed with a crossed-Nicols state polarizing microscope, the entire display region of the LCD 100 (including the regions 30*b* located above the polymer walls 16) exhibits a dark field (in the normally-black mode). In this state, if a disturbance of the alignment of the liquid crystal molecules 33 occurs, such a disturbance is recognized as a bright point, which may cause a significant lowering in contrast ratio.

When a gray scale voltage is applied to the liquid crystal layer 30, a force for aligning the major axes of molecules vertical to the direction of the electric field is exerted on the liquid crystal molecules 33 having negative dielectric anisotropy. As a result, the major axes of the liquid crystal molecules 33 are tilted from the alignment vertical to the substrate plane as shown in FIG. 1 (gray scale display state). In this state, the liquid crystal molecules 33 in the liquid crystal regions 30*a* are aligned axially symmetrically with respect to the center axes 35*a* shown by the dashed lines in FIG. 1 by the existence of the polymer walls 16. When this state is observed with a crossed-Nicols state polarizing microscope, extinction patterns are recognized along polarizing axes as shown in FIG. 2. In addition, the width WP of the polymer walls 16 of the LCD 100 of this embodiment is three sevenths or less of the width WL of the liquid crystal regions 30*a* (WP≦(3/7). WL). Therefore, the liquid crystal molecules present above the polymer walls 16 (in the regions 30*b*) are influenced by the alignment of the liquid crystal molecules 33 in the liquid crystal regions 30*a*, so as to be aligned axially symmetrically with respect to the center axes 35*b* formed in the respective regions 30*b*. Thus, when the liquid crystal panel applied with the gray scale voltage is observed with the crossed-Nicols state polarizing microscope, extinction patterns along polarizing axes are also recognized in the regions 30*b* located above the polymer walls 16 as shown in FIG. 2.

Figure 3:
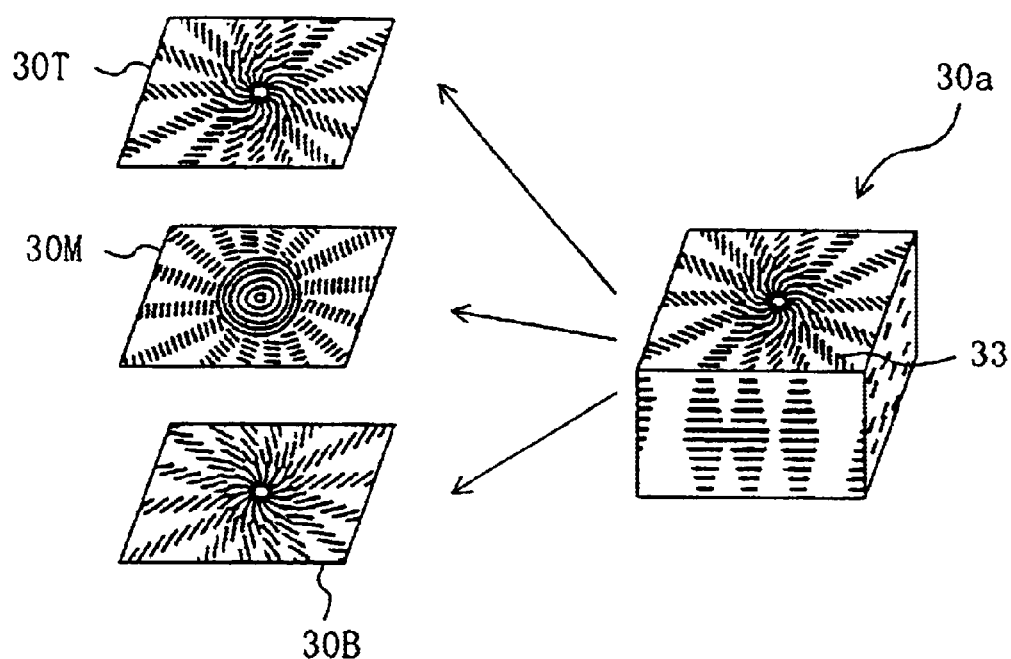
FIG. 3 schematically illustrates the axially symmetrical orientation state of liquid crystal molecules in a liquid crystal region of the LCD of EMBODIMENT 1.

The axially symmetrical alignment as used herein includes tangential and radial alignments. Spiral alignment shown in FIG. 3 is also included. The spiral alignment is obtained by adding a chiral agent to a liquid crystal material to provide a twisting force. Liquid crystal molecules in the liquid crystal region 30*a* are aligned spirally in a top portion 30T and a bottom portion 30B as shown in FIG. 3 while they are aligned tangentially in a middle portion 30M. The liquid crystal molecules have therefore twisted in the thickness direction of the liquid crystal layer. The center axis for this axially symmetrical alignment is substantially identical to the normal to the substrate.

The axially symmetrical alignment of liquid crystal molecules improves the viewing angle characteristic. More specifically, when liquid crystal molecules are aligned axially symmetrically, the refractive index anisotropy of the liquid crystal molecules is averaged over azimuthal directions. This solves the problem arising in the gray scale display state of the conventional TN mode LCD that the viewing angle characteristic varies considerably depending on the azimuthal direction. If a horizontal alignment film and a liquid crystal material having positive dielectric anisotropy are used, the axially symmetrical alignment will also be obtained in the voltage non-applied state. If liquid crystal molecules are aligned axially symmetrically at least in the voltage applied state, a wide viewing angle characteristic is obtained.

Figure 4:
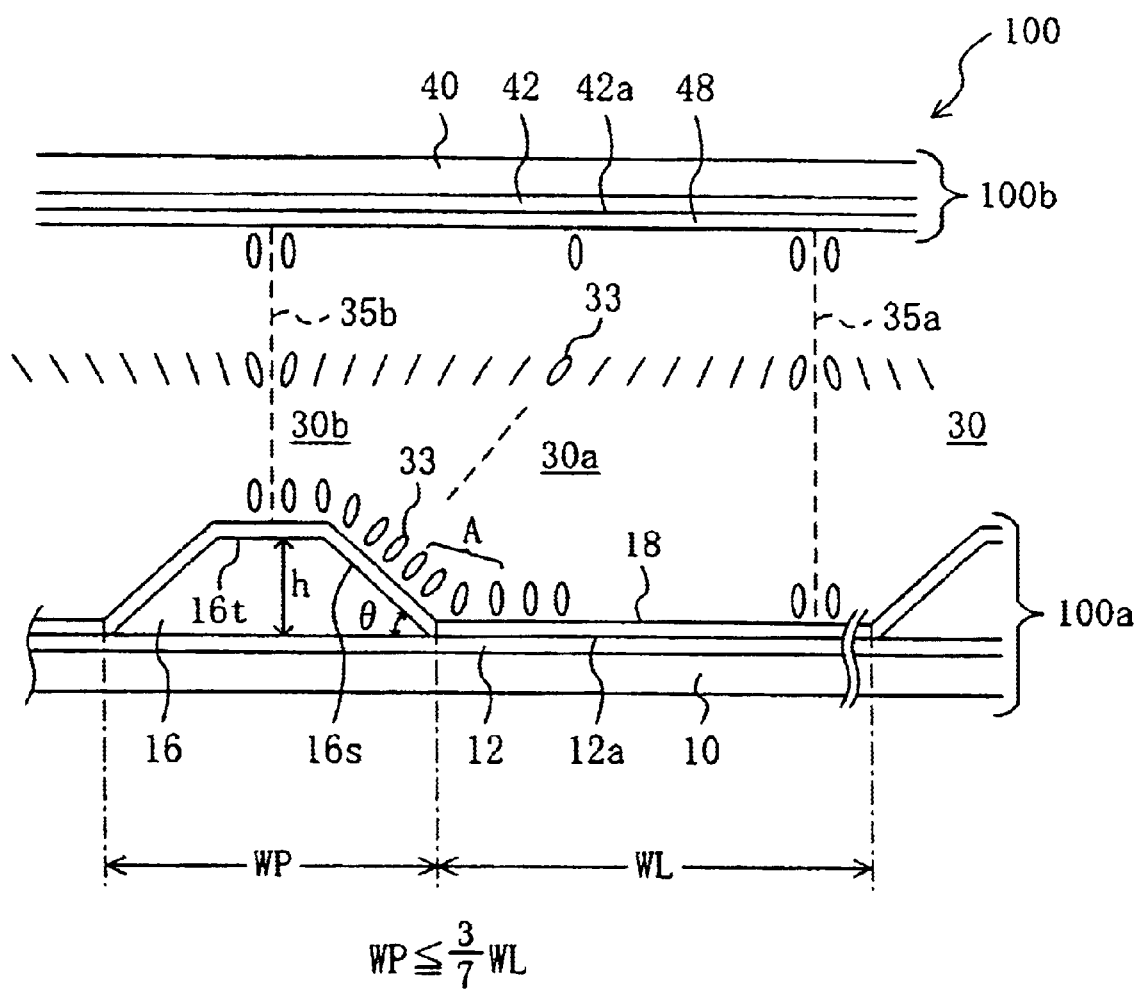
FIG. 4 is a partial enlarged view of the LCD of EMBODIMENT 1, schematically illustrating the alignment of liquid crystal molecules in the voltage non-applied state.

The structure and function of the transparent polymer walls 16 of the LCD 100 of the present invention will be described in more detail with reference to FIG. 4. FIG. 4 is a partial enlarged view of the LCD 100 shown in FIG. 1, schematically illustrating the alignment of the liquid crystal molecules 33 in the voltage non-applied state.

As shown in FIG. 4, in the voltage non-applied state, the liquid crystal molecules 33 are aligned vertical to a surface 12*a* of the first transparent electrode 12, a side face 16*s* and a top face 16*t* of the polymer wall 16, and a surface 42*a* of the second transparent electrode 42 formed on the second transparent substrate 40, under the alignment regulating force of the vertical alignment films 18 and 48.

The polymer wall 16 of the LCD 100 is made of a transparent material. For example, the polymer wall 16 is formed by patterning a film having a thickness of 1.0 μm made of a transparent resin material (for example, an acrylic negative photosensitive resin) having a transmittance of about 99.5% or more. With such a high transmittance, light incident vertical to the substrates 10 and 40 passes through the liquid crystal layer 30 while being hardly attenuated by absorption by the polymer wall 16. This improves the display brightness when viewed from the front. This also allows at least part of the liquid crystal molecules 33 present above the side face 16*s* and the top face 16T of the polymer wall 16 to contribute to display. That is, the aperture ratio of the LCD 100 improves. The transmittance of the polymer wall 16 for visible light (wavelength range: 400 nm to 800 nm) is preferably about 98% or more, more preferably about 99% or more. The polymer wall 16 may also be formed by patterning a transparent non-photosensitive resin using a resist. However, the use of a transparent photosensitive resin to form the polymer wall 16 by direct light exposure and development is advantageous in simplifying the production process.

However, as described above, merely using a transparent material for the formation of the polymer wall 16 may not provide sufficient improvement in display quality. This is mainly due to the following two phenomena. One is that the alignment of the liquid crystal molecules 33 in the region 30*b* located above the top face 16*t* of the polymer wall 16 is not stable. The other is that the alignment of the liquid crystal molecules 33 in a boundary region A shown in FIG. 4 is disturbed. The boundary region A is a region at and near the boundary between the side face 16*s* of the polymer wall 16 and the surface 12*a* of the transparent electrode 12. These phenomena are observed significantly when a vertical alignment film is used. The causes of the alignment failures in these regions will be described, together with the functions for minimizing these failures according to the present invention.

The liquid crystal molecules 33 present near the vertical alignment film 18 or 48 are aligned vertical to the vertical alignment film. When a voltage is applied between the electrodes 12 and 42 in the state where the liquid crystal molecules 33 having negative dielectric anisotropy have been aligned completely vertically, a force is generated that acts to fall the major axes of the liquid crystal molecules 33 in the direction vertical to the direction of the electric field. This falling of the major axes of the liquid crystal molecules 33 may be in any direction (azimuthal direction) as long as it is vertical to the direction of the electric field. Therefore, the direction in which the completely vertically aligned liquid crystal molecules 33 falls is not uniform. As shown in FIG. 4, with the existence of the polymer wall 16, the liquid crystal molecules 33 present in the middle of the liquid crystal layer 30 slightly tilt in specific directions (pre-tilt) by the influence of the alignment of the liquid crystal molecules 33 that is vertical to the side face 16s of the polymer wall 16. In other words, the pre-tilt directions of the liquid crystal molecules 33 are defined by the side wall effect of the polymer wall 16. As a result, the liquid crystal molecules 33 in the liquid crystal region 30a surrounded by the polymer walls 16 pre-tilt axially symmetrically with respect to the center axis 35a located substantially in the center of the liquid crystal region 30a. Likewise, the liquid crystal molecules 33 in the region 30b located above the top face 16t of the polymer wall 16 tilt in specific directions by the influence of the alignment of the liquid crystal molecules 33 in the liquid crystal region 30a. As a result, the liquid crystal molecules 33 in the region 30b pre-tilt axially symmetrically with respect to the center axis 35b located substantially in the center of the region 30b. Once a voltage is applied to the liquid crystal layer 30, the liquid crystal molecules 33 fall in the respective pre-tilt directions, whereby the axially symmetrical alignment is maintained.

However, the alignment of the liquid crystal molecules 33 in the region 30b located above the top face 16t of the polymer wall 16 may be unstable if the relationship between the width WP of the polymer wall 16 and the width WL of the liquid crystal region 30a fails to satisfy a certain condition. Table 1 below shows the results of an examination on the orientation states of the liquid crystal molecules 33 in the region 30b above the polymer wall 16 observed when the width WP of the polymer wall 16 and the width WL of the liquid crystal region 30a are varied. Assume that the liquid crystal region 30a has a square shape, and that the polymer walls on all the sides of the liquid crystal region 30a have a fixed width. The height of the polymer wall is about 1.0 $\mu$m and the taper angle is about 10°. In Table 1, mark ○ represents that the axially symmetrical alignment was established in all the regions 30b observed and mark X represents that the axially symmetrical alignment was not established in some of the regions 30b observed.

TABLE 1

| Width of Polymer wall WP ($\mu$m) | Width of LC Region WL ($\mu$m) | WP/WL | Orientation state in region 30b |
| --- | --- | --- | --- |
| 30 | 90 | 1/3 | ○ |
| 30 | 70 | 3/7 | ○ |
| 50 | 100 | 1/2 | X |
| 50 | 50 | 1/1 | X |

As is apparent from Table 1, when the width WP of the polymer wall 16 is three sevenths or less of the width WL of the liquid crystal region 30a (WP$\leq$(3/7).WL), the liquid crystal molecules 33 in the region 30b located above the polymer wall 16 are stably aligned axially symmetrically. However, when the width WP of the polymer wall 16 is a half or more of the width WL of the liquid crystal region 30a (WP$\leq$(½).WL), the axially symmetrical alignment of the liquid crystal molecules 33 in the region 30b located above the polymer wall 16 is disturbed. Therefore, the width WP of the polymer wall 16 is preferably less than a half of the width WL of the liquid crystal region 30a, more preferably three sevenths or less of the width WL.

The width WL of the liquid crystal region 30a itself influences the stability of the axial symmetrical alignment of the liquid crystal molecules 30a. If the width WL exceeds a certain value, the side wall effect of the polymer wall 16 may be insufficient resulting in failure to provide stable axially symmetrical alignment. Table 2 below shows the results of examinations on the orientation state of the liquid crystal molecules 33 in the liquid crystal region 30a and in the region 30b above the polymer wall 16 observed when the width WL of the liquid crystal region 30a is varied. Assume that the width WP of the polymer wall 16 equals to (3/7).WL and that the height and taper angle of the polymer wall 16 are the same as those in Table 1. Marks ○ and X represent the same states as those in Table 1, and mark $\Delta$ represents that the center of the axially symmetrical alignment is deviated from the center of the liquid crystal region 30a.

In the above example, it was assumed that the polymer walls 16 in a lattice shape surround the square liquid crystal regions 30a, and that the polymer walls 16 on all the sides of the liquid crystal region 30a have a fixed width. It should be noted that the relationship between the width WP of the polymer walls 16 and the width WL of the liquid crystal regions 30a described above is only established for the polymer wall 16 and the liquid crystal regions 30a that are adjacent to each other. In other words, the width WP of the polymer wall 16 is defined by the width WL of the liquid crystal region 30a located adjacent in the direction of the width of the polymer wall 16 (if the liquid crystal region 30a is a rectangle, the width WL of the liquid crystal region 30a is the length of the side of the rectangle in the same direction as that defining the width WP of the polymer wall 16 (width direction)). As described above, the mechanism for controlling the orientation of the liquid crystal molecules depends on the flexible nature of the liquid crystal material. Therefore, the widths WP and WL for providing the conditions for stable orientation of the liquid crystal molecules are defined by the widths in the direction parallel to the pre-tilt direction of the liquid crystal molecules.

TABLE 2

| Width of LC Region WL ($\mu$m) | Orientation state in LC region 30a | Orientation state in region 30b |
| --- | --- | --- |
| 50 | ○ | ○ |
| 100 | ○ | ○ |
| 150 | ○ | ○ |
| 200 | $\Delta$ | X |

As is apparent from Table 2, when the width WL of the liquid crystal region 30a is 150 $\mu$m or less, the liquid crystal molecules 33 both in the liquid crystal region 30a and in the region 30b above the polymer wall 16 are stably aligned axially symmetrically. However, when the width WL of the liquid crystal region 30a is 200 $\mu$m or more, the axially symmetrical alignment of the liquid crystal molecules 33 in the region 30b above the polymer wall 16 is disturbed. At this time, in the liquid crystal region 30a, the stability of the axially symmetrical alignment of the liquid crystal molecules 33 lowers. The lowering in the stability of the axially symmetrical alignment with an increase in the width WL of the liquid crystal regions 30a is more significant in the region 30b above the polymer wall 16. In consideration of the above, the width WL of the liquid crystal region 30a is preferably less than 200 $\mu$m, more preferably 150 $\mu$m or less.

In view of the above results, in order to stably secure the axially symmetrical alignment of the liquid crystal molecules 33 in the region 30b above the polymer wall 16, both the above conditions (the relative relationship between WL and WP and the requirement of WP itself) should preferably be satisfied. However, the stability of the axially symmetrical alignment of liquid crystal molecules is also influenced by other factors (for example, the height h and the taper angle θ of the polymer wall 16, the modulus of elasticity of the liquid crystal material, and the anchoring strength of the vertical alignment films). In consideration of the above, it is not necessarily required to satisfy both the above conditions. Even if only either one of the conditions is satisfied, an LCD providing stable axially symmetrical alignment may be obtained by adjusting the other factors described above.

The alignment failure in the boundary region A between the side face 16s of the polymer wall 16 and the surface 12a of the transparent electrode 12 can be minimized in the following manner. The side face 16s of the polymer wall 16 of the LCD 100 of this embodiment has a tilt angle (taper angle) θ with respect to the substrate surface. In the voltage non-applied state, the pre-tilt angle (the angle with respect to the transparent electrode surface 12a) of the liquid crystal molecules 33 present in the boundary region A depends on the tilt angle θ of the polymer wall 16. Therefore, if the tilt angle θ is large, the difference in pre-tilt angle is large between the liquid crystal molecules present above the transparent electrode surface 12a (about 90°) and the liquid crystal molecules present above the side face 16s of the polymer wall 16 (about (90−θ)°). As a result, in the boundary region A shown in FIG. 4, adjacent liquid crystal molecules have largely different pre-tilt angles, causing an abrupt discontinuous change in the pre-tilt angle of the liquid crystal molecules 33. This results in a disturbance of the alignment of the liquid crystal molecules 33 in this region. In this embodiment, the tilt angle θ is set at about 45° or less. This level of tilt angle permits the pre-tilt angle of the adjacent liquid crystal molecules 33 to change comparatively continuously in the boundary region A. This reduces occurrence of a disturbance of the alignment of the liquid crystal molecules 33 and thus realizes stable axially symmetrical alignment. Generation of a light leakage is therefore prevented in the periphery of the liquid crystal region 30a (in the boundary region A). As a result, a large contrast is secured in the black display and thus the display quality improves. If the tilt angle of the polymer wall is less than about 3°, the side wall effect for stably controlling the axially symmetrical alignment is lost. Therefore, the tilt angle θ of the polymer wall 16 is desirably about 3° or more.

In addition to reducing the tilt angle θ, the height h of the polymer wall 16 is preferably as small as possible. By reducing the height h of the polymer wall 16, it is possible to minimize the drop of the net voltage applied to the portion of the liquid crystal layer 30 located above the polymer wall 16 due to the existence of the polymer wall 16. In other words, it is possible to approximate the voltage substantially applied to the portion of the liquid crystal layer 30 located above the polymer wall 16 to the voltage applied to the portion thereof located above the transparent electrode surface 12a. This in turn approximate the voltage-transmittance characteristic of the portion of the liquid crystal layer 30 located above the polymer wall 16 to that of the portion thereof located above the transparent electrode surface 12a, thereby increasing the contribution to display of the liquid crystal molecules 33 present above the polymer wall 16. In addition, the reduction in the height h of the polymer wall 16 can further minimize the attenuation of light passing through the polymer wall 16. This increases the transmittance and thus further brightens the display. The height of the polymer wall 16 is preferably a half or less of the thickness of the liquid crystal layer 30 (cell gap). The influence of the height of the polymer wall 16 on the applied voltage is especially significant in an LCD adopting a plasma addressing driving method.

The method for fabricating the LCD 100 of this embodiment will be described in a concrete manner. The first substrate 100a is fabricated as follows. An ITO film is formed on the first transparent substrate 10 made of glass or the like and patterned to obtain the first transparent electrode 12 having a thickness of about 150 nm. An acrylic negative photosensitive resin (for example, CT of Fuji Film Olin Co., Ltd.) is applied to the entire first transparent electrode 12 to a thickness of about 1.0 $\mu$m with a spin coater and prebaked at about 130° C. for about 120 seconds. The film has a thickness of about 1.0 $\mu$m and a transmittance of about 99.5%. The resultant resin is then subjected to proximity light exposure via a photomask having a predetermined polymer wall pattern and development. The development is done for about 60 seconds using CD of Fuji Film Olin Co., Ltd. After rinsed and dried, the resultant substrate is subjected to one-hour post-baking at 230° C. Thus, the polymer walls 16 (height: about 1.0 $\mu$m, tilt angle: about 10°, width: about 25 $\mu$m) that substantially surround the liquid crystal regions 30a and have side faces tilting with respect to the substrate are formed on the first transparent substrate 10. The formation of the polymer walls 16 is done so that the tilt angle of the side faces thereof is in the range of about 3 to about 45 degrees by adjusting the gap (proximity gap) between the substrate surface and the photomask during the proximity light exposure and optimizing the prebake temperature after the application of the material. The size of the liquid crystal regions 30a is set appropriately in consideration of the conditions described above. Thereafter, the column protrusions 20 are formed on the wall structures 16 by photolithographic patterning using a photosensitive resin such as photosensitive polyimide. The thickness of the photosensitive resin that corresponds to the height of the column protrusions 20 is about 5.0 $\mu$m. The vertical alignment film 18 is then formed by spin-coating JALS-204 (JSR Corp.) on the resultant first transparent substrate 10 including the first transparent electrode 12, the polymer walls 16, and the column protrusions 20 formed thereon.

The second substrate 100b is fabricated in the following manner. An ITO film is formed on the second transparent substrate 40 made of glass or the like and patterned to obtain the second transparent electrode 42 having a thickness of 100 nm. The vertical alignment film 48 is then formed by spin-coating JALS-204 (JSR Corp.) on the resultant second transparent substrate 40.

The thus-fabricated first and second substrates 100a and 100b are bonded together. The gap between the first and second substrates 100a and 100b is defined by the sum of the height of the polymer walls 16 and the height of the column protrusions 20 of the first substrate 100a. In this embodiment, the cell gap is about 6 $\mu$m. An n-type liquid crystal material (a chiral agent is added so that 90-degree twist is obtained under Δε=−4.0, Δn=0.08, and the cell gap of 6 $\mu$m; splay elastic constant of the liquid crystal material $K_1$=14.6×$10^{-12}$ N, bend elastic constant $K_3$=15.9×$10^{-12}$ N) is injected in the gap between the bonded first and second substrates 110a and 100b.

Thus, the LCD 100 of this embodiment can be fabricated. A step of applying a voltage exceeding the threshold voltage (voltage providing a relative transmittance of 10%) may be added as required for stabilizing the axially symmetrical alignment.

An LCD of the normally-black mode having a size of the liquid crystal regions 30a of 80 μm×80 μm (width WL) and the width WP of the polymer walls 16 of 25 μm was actually fabricated by the fabrication method described above (Example 1). In the resultant LCD, the liquid crystal molecules both in the liquid crystal regions 30a and in the regions 30b located above the polymer walls 16 exhibited stable axially symmetrical alignment, and high-quality display without roughness was obtained. In addition, no alignment disturbance occurred in the regions 30b above the polymer walls 16 and in the boundary regions A between the polymer walls 16 and the transparent electrode 12. This resulted in improvement in transmittance in the white display state and prevention of generation of a light leakage in the black display state. The contrast ratio of the LCD of Example 1 was therefore higher by about 10% compared with that of an LCD of Comparative Example 1 described hereinafter.

Another LCD of the normally-black mode having a size of the liquid crystal regions 30a of 130 μm×150 μm (width WL) and the width WP of the polymer walls 16 of 40 μm was also fabricated by the fabrication method described above (Example 2). The ratio of WP/WL is smaller than 3/7 whichever side corresponds to the width WL (40/130 or 40/150). Therefore, the liquid crystal molecules both in the liquid crystal regions 30a and in the regions 30b located above the polymer walls 16 exhibited stable axially symmetrical alignment, and high-quality display without roughness was obtained.

COMPARATIVE EXAMPLES

LCDs having a different width WL of the liquid crystal regions 30a and/or a different width WP of the polymer walls 16 from those in Examples 1 and 2 were fabricated by substantially the same method as that in Examples 1 and 2 (Comparative Examples 1 and 2).

In the LCD of Comparative Example 1, the size of the liquid crystal regions 30a was 100 μm×80 μm (width WL) and the width WP of the polymer walls 16 was 50 μm. The ratio of WP/WL in this comparative example is larger than 3/7 whichever side corresponds to the width WL (50/100 or 50/80). Therefore, in this LCD, while the liquid crystal molecules 33 in the liquid crystal regions 30a exhibited stable axially symmetrical alignment, the liquid crystal molecules 33 in the regions 30b located above the polymer walls 16 exhibited unstable axially symmetrical alignment (corresponding to the mark X in Table 1). As a result, display with roughness was obtained.

In the LCD of Comparative Example 2, the size of the liquid crystal regions 30a was 200 μm×250 μm (width WL) and the width WP of the polymer walls 16 was 50 μm. The ratio of WP/WL in this comparative example is smaller than 3/7 whichever side corresponds to the width WL (50/200 or 50/250). However, the width WL of the liquid crystal regions 30a exceeds 150 μm. Therefore, in this LCD, the liquid crystal molecules 33 in the liquid crystal regions 30a failed to exhibit stable axially symmetrical alignment (corresponding to the mark Δ in Table 2), and the liquid crystal molecules 33 in the regions 30b located above the polymer walls 16 exhibited unstable axially symmetrical alignment (corresponding to the mark X in Table 2). As a result, the LCD of this comparative example failed to obtain a uniform display characteristic (viewing angle characteristic) over azimuthal directions that should otherwise be obtained by the ASM mode LCD. Moreover, roughness of display was significant.

Embodiment 2

Figure 5:
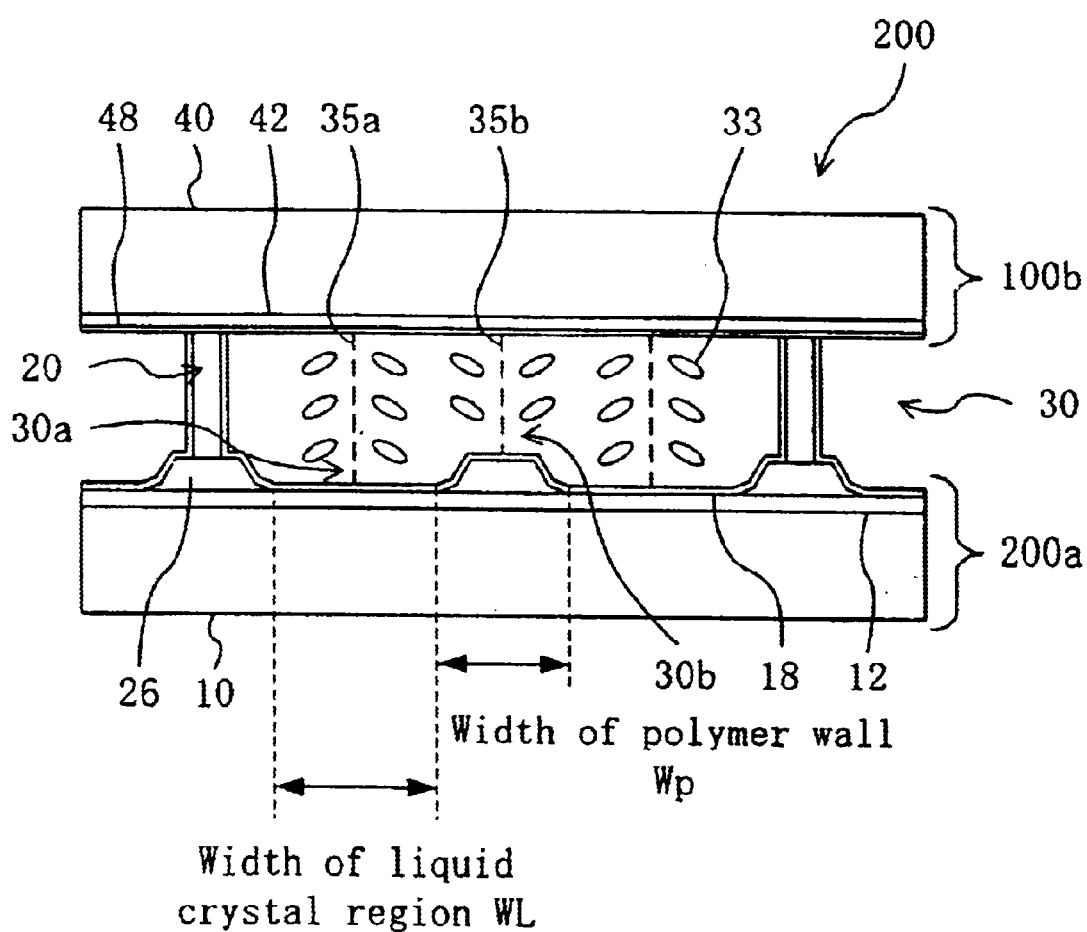
FIG. 5 is a schematic cross-sectional view of a liquid crystal display device (LCD) of EMBODIMENT 2 of the present invention.
Figure 6:
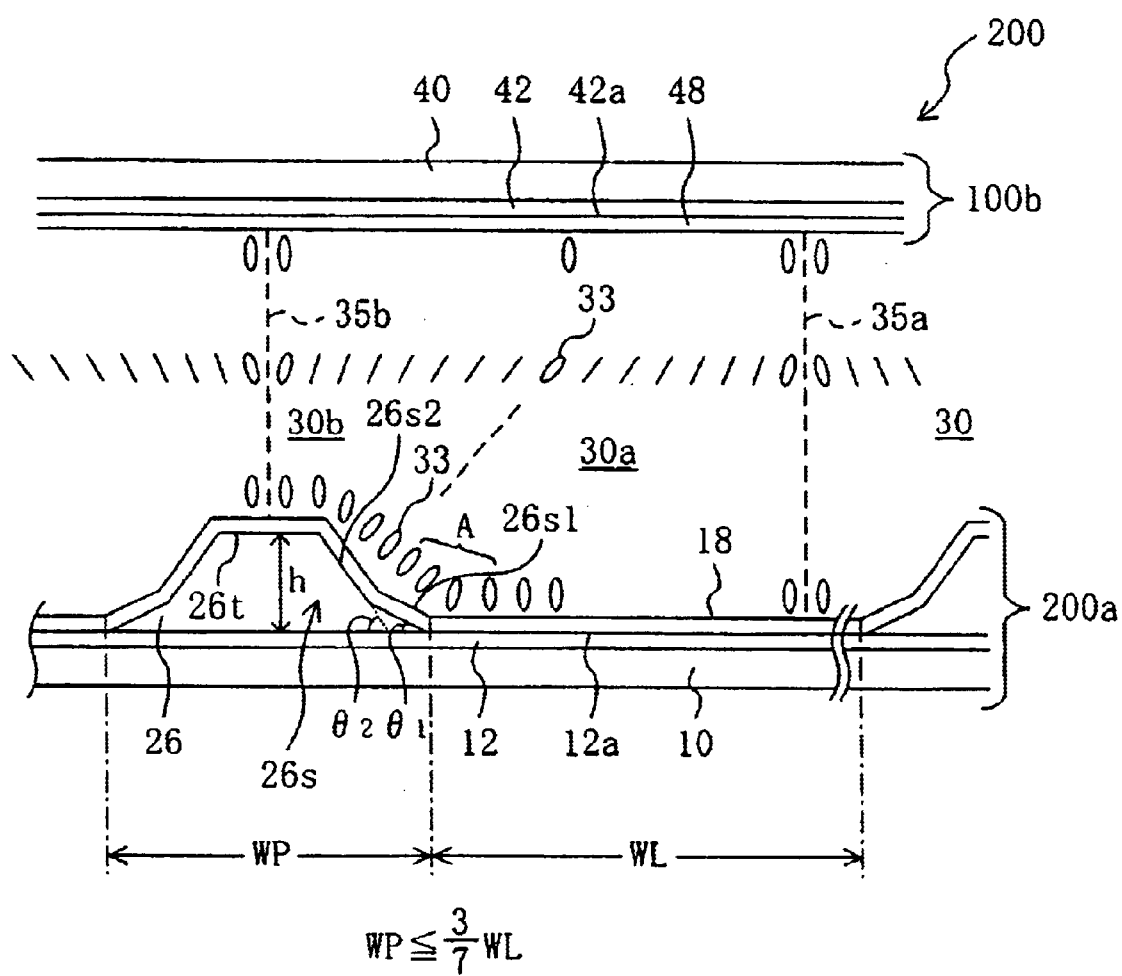
FIG. 6 is a partial enlarged view of the LCD of EMBODIMENT 2.
Figure 7:
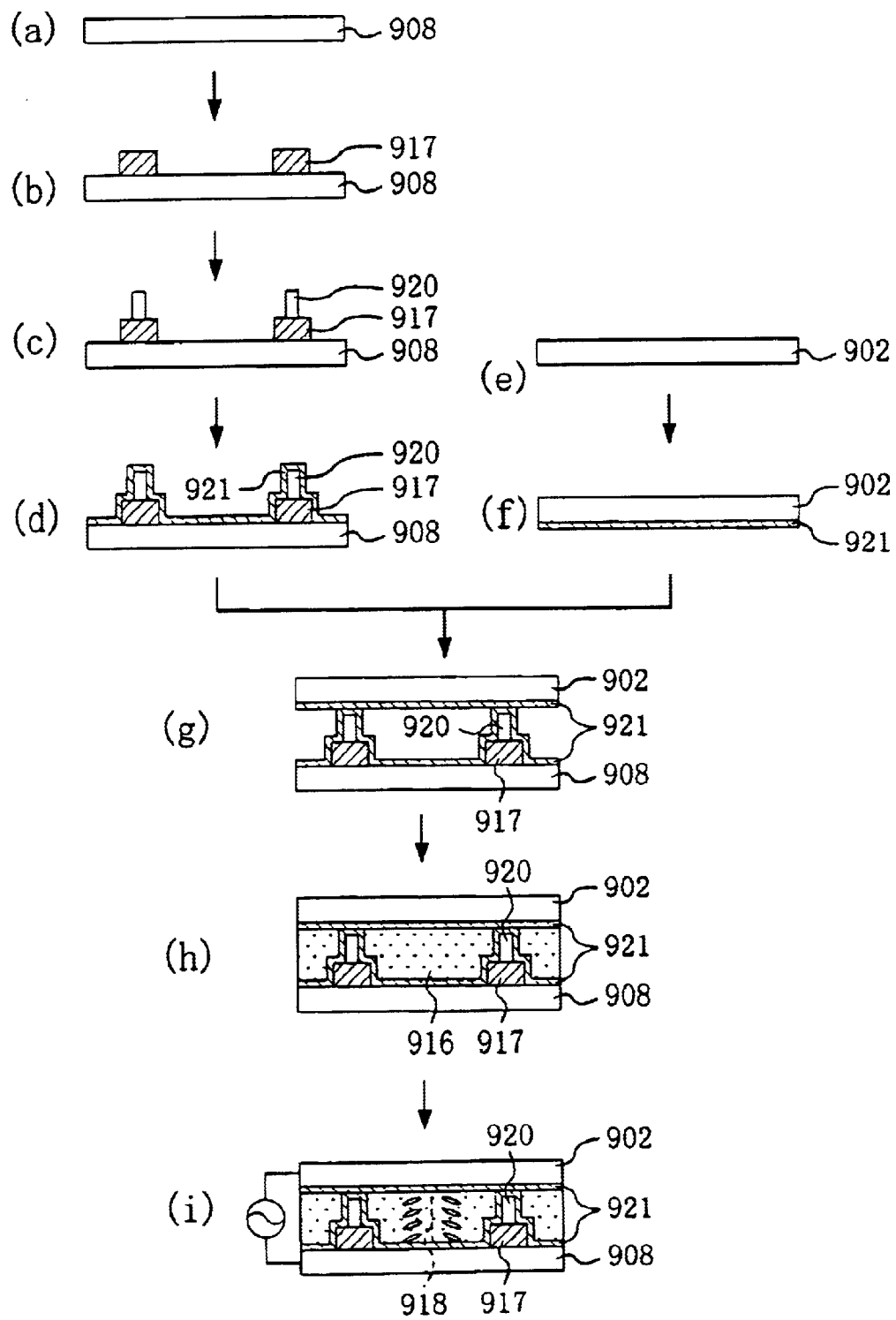
FIG. 7 illustrates the steps for fabricating a conventional ASM mode LCD.
Figure 8:
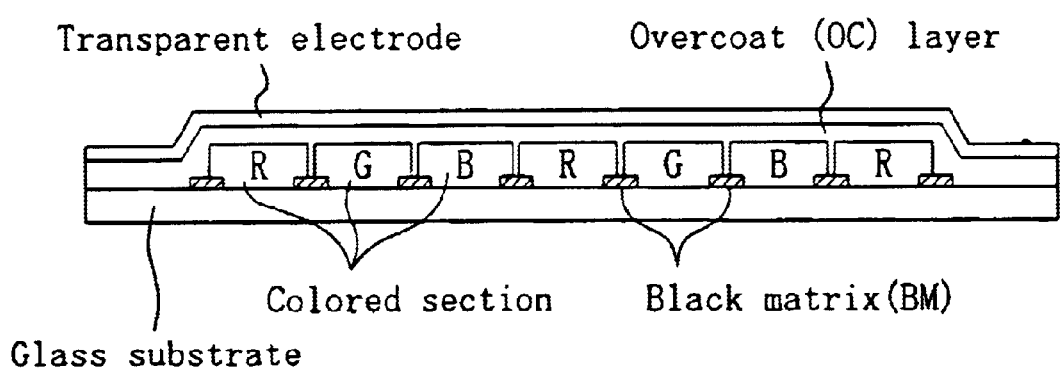
FIG. 8 is a cross-sectional view of a conventional color filter.

The cross-sectional structure of a liquid crystal display device (LCD) 200 of EMBODIMENT 2 of the present invention is schematically shown in FIG. 5. The LCD 200 of this embodiment is different from the LCD 100 of EMBODIMENT 1 in that a side face 26s of each polymer wall 26 of a first substrate 200a has a first tilt portion 26s1 and a second tilt portion 26s2 that are different in tilt angle. FIG. 6 is a partial enlarged view of FIG. 5 focusing on the polymer wall 26. In FIGS. 5 and 6, components of LCD 200 of this embodiment having substantially the same functions as those of LCD 100 are denoted by the same reference numerals, and the description thereof is omitted here.

As shown in FIGS. 5 and 6, the side face 26s of the polymer wall 26 of the LCD 200 has the first tilt portion 26s1 and the second tilt portion 26s2 that are different in tilt angle. A tilt angle θ1 of the first tilt portion 26s1 closer to the surface of the substrate 10 is smaller than a tilt angle θ2 of the second tilt portion 26s2 closer to a top face 26t of the polymer wall 26. The tilt angle θ1 of the first tilt portion 26s1 is determined so that the alignment of the liquid crystal molecules 33 in the boundary region A between the surface of the substrate 10 and the polymer wall 26 can change continuously. The tilt angle θ1 is therefore preferably set at 5° or less. The tilt angle θ2 of the second tilt portion 26s2 is determined so that an alignment regulating force sufficient to stably align the liquid crystal molecules 33 axially symmetrical can be exerted on the liquid crystal molecules 33. The tilt angle θ2 is therefore preferably set at 10° or more. Moreover, the tilt angles (θ1 and θ2) of the tilt portions (26s1 and 26s2) of the side face 26s should preferably shift to each other gently. Therefore, the difference in tilt angle between at least two adjacent tilt portions is preferably 5° or less.

In the illustrated example, the side face 26s has only the first tilt portion 26s1 and the second tilt portion 26s2. It is more preferable, however, to have a tilt structure where at least one tilt portion having a different tilt angle is additionally formed between the first tilt portion 26s1 and the second tilt portion 26s2. It would be understood that the side face 26s can be a curved face, or can be a combination of a tilt face and a curved face.

In particular, it is advantageous to adopt a tilt structure where the tilt angle gradually increases as it is located farther from the surface of the substrate 10 and closer to the top face 26t of the polymer wall 26. By this tilt structure, it is possible to form a tilt portion having a tilt angle larger than the tilt angle of a single-angle tilt structure. More concretely, an angle exceeding 45° can be formed for the tilt portion 26s2 closest to the top face 26t of the polymer wall 26. According to the results of an examination conducted by the present inventors, the alignment regulating force on liquid crystal molecules 33 increases as the tilt angle is larger just as it increases as the polymer walls 26 are taller. Therefore, by forming a tilt portion having a larger tilt angle, a sufficient alignment regulating force can be secured even if the height h of the polymer walls is small. If the height h of the polymer wall 26 is small, light attenuation due to the existence of the polymer wall 26 is reduced. Thus, the display brightness improves compared with the conventional case.

In order to realize a tilt angle θ2 exceeding 45° (and not more than 90°) for the second tilt portion 26s2, a plurality of tilt portions or a curved portion is preferably provided between the first tilt portion 26s1 and the second tilt portion 26s2. By this structure, the tilt angle θ1 of the first tilt portion 26s1 closest to the surface of the substrate 10 can be set at 5° or less and the difference in tilt angle between the adjacent tilt portions can be kept at 5° or less. The width (length of the slope) of each tilt portion is preferably about 1 µm or more. If the slope is formed of a curve, the curve is preferably such that the change in tilt angle (tilt angle of a tangent) over the length of 1 µm is 5° or less.

As described above, the LCD 200 of this embodiment permits the liquid crystal molecules 33 present above the side face 26s of the transparent polymer wall 26 and those present above the top face 26t thereof (in the region 30b) to contribute to display. Also, the LCD 200 minimizes occurrence of a disturbance of the alignment of the liquid crystal molecules 33 present in the boundary region A between the polymer wall 26 and the liquid crystal region 30a (in the periphery of the liquid crystal regions 30a) and a disturbance of the alignment of the liquid crystal molecules 33 present above the polymer wall 26 (in the region 30b). As a result, high-quality display free from roughness is realized. The LCD 200 of this embodiment, as the LCD 100 of EMBODIMENT 1, has a wide viewing angle characteristic and realizes bright and roughness-free display.

It would be understood that a combination of the structures of EMBODIMENTS 1 and 2 can further stabilize the axially symmetrical alignment of the liquid crystal molecules 33 in the liquid crystal regions 30a and those above the polymer walls (in the regions 30b).

The LCD 200 of EMBODIMENT 2 can be fabricated basically by the same method as that for the LCD 100 of EMBODIMENT 1. The polymer walls 26 having the first tilt portion 26s1 and the second tilt portion 26s2 that are different in tilt angle can be formed in the following manner, for example.

A transparent acrylic negative photosensitive resin for the polymer walls 26 is applied to the substrate 10 and then prebaked at a temperature (for example, 140° C.) higher than that for the formation of the polymer walls 16 having a single tilt angle in EMBODIMENT 1. The resultant substrate is exposed to light using a photomask having a predetermined pattern and developed as in EMBODIMENT 1. The substrate is then sprayed with pure water under a high pressure (for example, 100 kg/cm$^2$), and post-baked at 220° C., for example. In this way, the polymer walls 26 having the above-described structure is obtained. By using a higher prebaking temperature for the negative photosensitive resin for the polymer walls 26, the adhesive strength of the resin improves. This makes the portions of the resin corresponding to the periphery of openings of the mask more likely to be left behind in the development and/or spray-rinse steps, resulting in the formation of the two-stage tilt faces. The polymer walls having tilt portions different in tilt angle can be formed by a method other than that described above, such as using a plurality of masks and using other light exposure and development conditions.

Thus, according to the present invention, in an ASM mode LCD device, liquid crystal molecules present above the polymer walls made of a transparent resin are stably aligned axially symmetrically and contributable to display. Therefore, the present invention provides an LCD that has a wide viewing angle characteristic and can realize bright and roughness-free display.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A liquid crystal display device comprising:
    a first substrate, a second substrate, and a liquid crystal layer sandwiched between the first and second substrates,
    wherein the first substrate includes polymer walls comprising a transparent resin,
    wherein the liquid crystal layer has a plurality of first liquid crystal regions separated from one another by the polymer walls,
    wherein, as viewed from above, liquid crystal molecules in the plurality of first liquid crystal regions are aligned axially symmetrically around all lateral sides of first respective axes defined in the plurality of first liquid crystal regions in at least a voltage applied state, the first axes being vertical to a surface of the first substrate, and
    wherein, as viewed from above, liquid crystal molecules above the polymer walls are aligned axially symmetrically around all lateral sides of second respective axes defined above the polymer walls in at least a voltage applied state, the second axes being vertical to the surface of the first substrate.

2. The device of claim 1, wherein the width of the polymer walls is three sevenths or less of the width of the first liquid crystal regions which are adjacent to the respective polymer walls.

3. The device of claim 1, wherein the width of the first liquid crystal regions is 150 µm or less.

4. The device of claim 1, wherein the polymer walls have a face tilting with respect to the surface of the first substrate.

5. The device of claim 4, wherein the tilt face of the polymer walls has a first tilt portion tilting at a first tilt angle with respect to the surface of the first substrate and a second tilt portion tilting at a second tilt angle with respect to the surface of the first substrate, the first tilt angle is smaller than the second tilt angle, and the first tilt portion is closer to the surface of the first substrate than the second tilt portion.

6. The device of claim 5, wherein the first tilt angle is 5° or less.

7. The device of claim 5, wherein the second tilt angle is 10° or more.

8. The device of claim 5, wherein the tilt face of the polymer walls has a plurality of further tilt portions provided between the first tilt portion and the second tilt portion and the different in tilt angle between adjacent tilt portions is 5 degrees or less.

9. The device of claim 1, wherein the liquid crystal layer includes a liquid crystal material having negative dielectric anisotropy.

10. The device of claim 1, wherein the height of the polymer walls is smaller than a half of the thickness of the liquid crystal layer.

11. The liquid crystal display device of claim 1, wherein only one of said first axes is provided between adjacent first and second polymer walls.

12. The liquid crystal display device of claim 1, with respect to being aligned axially symmetrically, axial symmetric alignment includes at least one of tangential alignment, radial alignment, and spiral alignment.

13. A liquid crystal display comprising:
    a first substrate supporting polymer walls comprising substantially transparent resin,
    a second substrate, a liquid crystal layer provided between the first and second substrates, first liquid crystal regions each located at least partially located between adjacent polymer walls, second liquid crystal regions each at least partially located between a top surface of one of the polymer walls and the second substrate, and wherein, as viewed from above, liquid crystal molecules in the second liquid crystal regions are aligned axially symmetrically around all lateral sides of respective axes that extend from the top surfaces of the polymer walls toward the second substrate.

14. The display of claim 13, wherein liquid crystal molecules in the first liquid crystal regions are aligned axially symmetrically with respect to axes that are defined between adjacent polymer walls and are vertically oriented with respect to at least the first substrate.

15. The display of claim 13, wherein the width(s) of the polymer walls is three sevenths or less of the width(s) of the first liquid crystal regions.

16. The display of claim 13, wherein the width of a first one of the polymer walls is three sevenths or less of the width of an adjacent first one of the first liquid crystal regions.

17. The liquid crystal display device of claim 13, wherein the liquid crystal molecules in the second liquid crystal regions are aligned axially symmetrically around all lateral sides of respective axes in at least a voltage applied state.

18. The liquid crystal display device of claim 13, with respect to being aligned axially symmetrically, axial symmetric alignment includes at least one of tangential alignment, radial alignment, and spiral alignment.

19. A liquid crystal display comprising:

a first substrate supporting walls, a second substrate, a liquid crystal layer provided between at least the first and second substrates, a first liquid crystal region located at least partially between adjacent walls, wherein, as viewed from above in at least a voltage applied state, liquid crystal molecules in the first liquid crystal region are aligned axially symmetrically around all lateral sides of a first axis located between the adjacent walls, said first axis extending upwardly from the first substrate toward the second substrate, a second liquid crystal region at least partially located between a top of one of the adjacent walls and the second substrate, and wherein, as viewed from above, liquid crystal molecules in the second liquid crystal region are aligned axially symmetrically around all lateral sides of a second axis that extends from the top of one of the walls toward the second substrate.

20. The liquid crystal display of claim 19, with respect to being aligned axially symmetrically, axial symmetric alignment includes at least one of tangential alignment, radial alignment, and spiral alignment.

* * * * *